United States Patent
Wolf et al.

(10) Patent No.: US 10,518,290 B2
(45) Date of Patent: Dec. 31, 2019

(54) DEVICE FOR INSERTING A PLUGGING COMPOUND INTO AN OPENING

(71) Applicant: HENKEL AG & CO KGAA, Duesseldorf (DE)

(72) Inventors: Karsten Wolf, Duesseldorf (DE); Kai Ruthe-Steinsiek, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/120,419

(22) PCT Filed: Feb. 19, 2015

(86) PCT No.: PCT/EP2015/053490
§ 371 (c)(1),
(2) Date: Oct. 12, 2016

(87) PCT Pub. No.: WO2015/124667
PCT Pub. Date: Aug. 27, 2015

(65) Prior Publication Data
US 2017/0066006 A1    Mar. 9, 2017

(30) Foreign Application Priority Data
Feb. 20, 2014   (DE) ........................ 10 2014 203 078

(51) Int. Cl.
*B05C 17/005*    (2006.01)
*B05C 5/02*    (2006.01)
(Continued)

(52) U.S. Cl.
CPC .......... *B05C 17/00593* (2013.01); *B05C 5/00* (2013.01); *B05C 5/02* (2013.01);
(Continued)

(58) Field of Classification Search
CPC ....... B05C 17/00593; B05C 5/00; B05C 5/02; B05C 5/0225; B05C 7/00; B05C 7/02;
(Continued)

(56) References Cited

U.S. PATENT DOCUMENTS

| | | |
|---|---|---|
| 2,110,053 A | 3/1938 | Phillips |
| 2,291,929 A | 8/1942 | Taylor |

(Continued)

FOREIGN PATENT DOCUMENTS

| | | |
|---|---|---|
| DE | 3248143 A1 | 6/1984 |
| DE | 3312952 A1 | 10/1984 |

(Continued)

OTHER PUBLICATIONS

International Search Report for International PCT Patent Application No. PCT/EP2015/053490 dated Jun. 1, 2015.

*Primary Examiner* — William P Fletcher, III
(74) *Attorney, Agent, or Firm* — James E. Piotrowski (57) ABSTRACT

A device (1) for introducing a plugging compound (20) into a borehole (21), the device having a sleeve (2) with a cavity (3) for receiving the plugging compound (20). On one side, the sleeve (2) has a discharge opening (5), corresponding to the cavity (3), for discharging the plugging compound (20), and a support section (7), projecting laterally from the sleeve, for providing a support option for the sleeve (2) during introduction of the plugging compound (20). On the opposite side of the sleeve (2), an upper opening (4) is provided, through which a piston (16) together with a feed plate (18) protrudes into the cavity (3). The piston (16) is movable relative to the sleeve (2) in such a way that the feed plate (18) can be displaced in the cavity (3), for example to allow the plugging compound (20) to be received and dispensed.

16 Claims, 6 Drawing Sheets

(51) Int. Cl.
    *B05D 7/06* (2006.01)
    *B05D 1/26* (2006.01)
    *B05C 5/00* (2006.01)
    *B05D 5/00* (2006.01)
    *B05D 7/22* (2006.01)
    *B05C 7/00* (2006.01)
    *B05C 7/02* (2006.01)
    *B05C 17/01* (2006.01)
    *F16B 13/14* (2006.01)

(52) U.S. Cl.
    CPC .............. *B05C 5/0225* (2013.01); *B05C 7/00* (2013.01); *B05C 7/02* (2013.01); *B05C 17/005* (2013.01); *B05C 17/00503* (2013.01); *B05C 17/00576* (2013.01); *B05C 17/01* (2013.01); *B05D 1/26* (2013.01); *B05D 1/265* (2013.01); *B05D 5/005* (2013.01); *B05D 7/06* (2013.01); *B05D 7/22* (2013.01); *F16B 13/141* (2013.01); *B05D 2202/00* (2013.01); *B05D 2203/20* (2013.01); *B05D 2259/00* (2013.01); *F16B 13/146* (2013.01)

(58) Field of Classification Search
    CPC ............ B05C 17/005; B05C 17/00503; B05C 17/00576; B05C 17/01; B05D 1/265; B05D 1/26; B05D 5/005; B05D 7/06; B05D 7/22; B05D 2202/00; B05D 2203/20; B05D 2259/00; F16B 13/141; F16B 13/146
    See application file for complete search history.

(56) References Cited

U.S. PATENT DOCUMENTS

| | | | |
|---|---|---|---|
| 2,930,199 A * | 3/1960 | Jarund | .............. E21D 20/021 |
| | | | 405/259.5 |
| 5,046,877 A | 9/1991 | Longo | |
| 5,566,866 A | 10/1996 | Jacobsen et al. | |
| 2004/0173561 A1 | 9/2004 | Wolfe | |

FOREIGN PATENT DOCUMENTS

| | | | | |
|---|---|---|---|---|
| DE | 3723100 A1 * | 1/1989 | .............. | B05C 7/00 |
| DE | 20201686 U1 | 4/2002 | | |
| EP | 1308137 A2 | 5/2003 | | |
| EP | 1378332 A2 | 1/2004 | | |
| GB | 192957 A | 2/1923 | | |
| GB | 2127283 A | 4/1984 | | |
| GB | 2207726 A | 2/1989 | | |

\* cited by examiner

DEVICE FOR INSERTING A PLUGGING COMPOUND INTO AN OPENING

The invention relates to a device for introducing a plugging compound into an opening, for example a borehole or mortise.

Numerous plugging techniques are known in the prior art. For example, dowels, in particular expansion dowels, are used in the construction sector. Such dowels are usually inserted into a borehole. When a fastening element, for example a screw or a nail, is introduced into the dowel, the material of the dowel is deformed and displaced outwardly. The connecting means accordingly spreads the dowel apart, resulting in a form-fit and/or force-fit connection to the wall of the borehole. The anchoring force of the known expansion dowels also depends in particular on the inherent strength of the building material. Thus, use of such dowels may be difficult, in particular when lightweight blocks and hollow blocks, aerated concrete, or similar materials are employed.

In addition, there are chemical plugging compounds made of multiple components, which are introduced directly into the borehole by means of a pressurized container, for example, where they are admixed, foamed, and cured. GB 2207726(A), for example, describes such an approach. A similar approach is followed in DE 3248143 A1, with a dowel for form-fit anchoring in cavities, using an absorbent dowel element which is solidifiable by means of a curing compound, the dowel, for example, being soaked in the curing compound prior to placement in a borehole and immediately introduced into the borehole, whereupon the compound cures with foaming and allows form-fit anchoring. DE 20201686 U1, in turn, discloses a plastic dowel which has a container with a polyurethane system inside. After the plastic dowel is introduced, the container is destroyed, for example by means of a screw that is introduced into the dowel, thus releasing the polyurethane system, so that the system reacts with moisture in the surrounding air, with foaming, to form a polyurethane. In all of these approaches, for example the handling is difficult, in particular for laypersons. For example, too much plugging compound may be used, thus soiling the application area around the borehole. When too little plugging compound is used, the quality of the fastening is often less than satisfactory.

The use of kneadable compounds which are introduced into the borehole has also been known for quite some time. For example, U.S. Pat. No. 2,110,053 discloses a method for securing a fastening means in a borehole, in which a kneadable compound is introduced into a borehole and subsequently pressed, using a punch. An opening is then produced by puncturing, and a screw may be screwed into the opening after the compound cures. A similar approach is also disclosed in U.S. Pat. No. 2,291,929 A. With such an approach, it is difficult to securely introduce the kneadable compound into the borehole.

The object of the invention, therefore, is the use of an improved device for introducing a plugging compound into a borehole.

This object is achieved by the features of the main claim.

Advantageous embodiments are set forth in the subclaims.

The core concept of the invention is the use of a device for introducing a plugging compound into a borehole or some other opening, the device having a sleeve with a cavity for receiving the plugging compound, the sleeve on one side having a discharge opening, corresponding to the cavity, for discharging the plugging compound, and a support section, projecting laterally from the sleeve, preferably at the level of the discharge opening, for providing a support option for the sleeve during introduction of the plugging compound, for example on a substrate, such as masonry, having the borehole, and on the opposite side of the sleeve an upper opening being provided, through which a piston having a feed plate protrudes into the cavity, the piston being movable relative to the sleeve in such a way that the feed plate can be displaced in the cavity, for example to allow the plugging compound to be received and dispensed.

Many advantages may be achieved using a device of this type. The user can precisely meter the plugging compound without directly coming into contact with the plugging compound when the plugging compound is introduced into the borehole. In addition, by use of the support section a bearing surface for the device may be provided, by means of which the user may support the device on the substrate, for example the masonry, around the borehole during introduction of the plugging compound into a borehole. The sleeve is preferably made of a plastic material, in particular a plastic material such as polyethylene or polypropylene, the support section or the support sections preferably being connected in one piece to the sleeve. The sleeve may thus be manufactured by an injection molding process in which the support section or the support sections is/are molded directly onto the sleeve. In one advantageous embodiment, the piston together with the feed plate, which is preferably connected to the piston in one piece, is likewise made of a plastic material. The piston may be molded onto the sleeve in an injection molding process in order to save on manufacturing costs. In this regard, a connecting seam which may be destroyed by the user prior to application may be provided, for example, between the edge delimiting the upper opening and the outer edge of the feed plate.

Plugging compounds known in the prior art, for example two-component kneading compounds, in particular may be used as plugging compound. These kneading compounds are also known as kneading plugs, molding plugs, plugging compounds, or power dough. These types of kneading compounds are usually produced based on epoxy resin, the two components generally being mixed together by the user immediately before application by kneading manually, for example. After mixing, the user may fill the kneading compound into the cavity in the sleeve, or take the kneading compound into the device and subsequently introduce it into a borehole. Of course, other plugging compounds are also conceivable. For example, plugging compounds which have somewhat expansive properties and which expand in the borehole may also be used. Paste-like to highly viscous paste-like plugging compounds, which may be discharged with great effort by means of cartridges and mixing devices attached thereto, are preferably used.

Another advantage is the use of a cavity which has a cylindrical shape, at least in the area in which the feed plate can be displaced in the cavity. A sleeve having a substantially hollow cylindrical basic shape is preferably used, so that the cavity has a cylindrical shape essentially over its entire length. Of course, with the substantially hollow cylindrical basic shape, it is conceivable for the sleeve to have add-on parts, such as the support sections described above, or also gripping or guiding aids or the like. In addition, it is conceivable for the substantially cylindrical cavity at some locations to have different cross-sectional areas in places, for example due to projections, collar detent points, or similar elements which limit the movement path of the feed plate and protrude into the cavity.

In one advantageous refinement, the discharge opening is aligned with an inner wall which delimits the cavity. Accordingly, it is advantageous to provide a discharge opening which has the same cross section as the region of the cavity directly adjoining the discharge opening. A cylindrical cavity is preferably used here, at least in the area in which the feed plate is displaceable in the cavity, the discharge opening preferably having the same cross section as the cavity. In this advantageous refinement, a reduction in the cross section or a narrowing in the region of the discharge opening is thus dispensed with, so that the in particular paste-like to highly viscous paste-like plugging compound may be discharged more easily.

Another advantage is a design in which the piston is movable on both sides relative to the sleeve, in particular to allow the plugging compound to be received into the cavity and discharged for introduction into a borehole. Another advantage is the small storage size of the device when it is not in use. For example, in the delivered state the piston may be displaced in the direction of the discharge opening in the sleeve in such a way that the feed plate is situated in the vicinity of the discharge opening or directly adjoins the discharge opening. Thus, the piston to a large extent is situated within the cavity in the sleeve, so that the size of the device, and thus the package size, may be reduced.

Another advantage is the provision of the support section with a support surface, whereby the support surface and an end face of the sleeve, which may delimit the discharge opening, for example, lie in a plane. The discharge opening preferably has an opening edge which is part of the sleeve and which has the mentioned end face in the distal direction or merges into the end face. In this embodiment it has proven to be advantageous when the end face lies in a plane with the support surface or merges into same. This preferred embodiment may facilitate handling, for example, in that on the one hand the plugging compound may be precisely introduced into a borehole, thus making it possible to provide support on the areas of masonry, for example, surrounding the borehole. On the other hand, it is possible to safely remove the device after the introduction without the plugging compound being pulled out of the borehole. Due to the special design, the device may, for example, be displaced laterally after the introduction, or the plugging compound may be sheared off from the feed plate, for example, by some other type of displacement.

In one advantageous refinement, the support section has the support surface, a free space being provided between the support surface and the end face which delimits the opening. This free space may save material, for example, so that the manufacturing costs may be reduced. In addition, the free space may be used as an option for receiving excess plugging compound. When the user completes work and removes the device from the borehole provided with plugging compound, this is preferably done by carrying out a shearing movement which initiates the removal. This is preferably carried out by an initial movement in the lateral direction, i.e., substantially in parallel to the substrate, for example an outer side of a wall, to allow the plugging compound to be sheared off from the feed plate. If a residue of plugging compound should, for example, remain on the end face or protrude from the borehole, this residue may be transported, in particular from the area of the support section, such as a projecting edge, delimiting the support surface, into the free space during the shearing movement without soiling the surroundings. In addition, the free space may prove to be advantageous, since the stability of the support section may be increased by such a design with little expenditure of material.

Another advantage is the arrangement of the support surface on a circumferential support edge, and the arrangement of the end face on the opening edge, whereby the support edge and the opening edge are preferably spaced apart from one another in such a way that a free space is provided, at least in areas, between the support surface and the end face. Due to the use of a circumferential support edge, a circumferential support or bearing option for the device on all sides of the sleeve may be provided in order to ensure particularly simple handling for the user. In one advantageous refinement, the support area has an oval shape, for example, the support edge extending on the outer side of the support area, following the oval shape of the support area. In addition, the advantages described above, such as increased stability of the support area and/or provision of an option for receiving excess plugging compound, may be achieved by providing a free space in the above-described preferred embodiment of the spaced-apart arrangement, at least in areas, of the support edge and the opening edge.

Another advantage is the provision of the support surface with slip-resistant means to be able to ensure a secure hold on a substrate, for example masonry. In particular rubber inserts or ribs are conceivable. Use of a rough surface may also prove to be practical.

In one advantageous refinement of the invention, the sleeve has a retaining means for the piston, preferably for the feed plate of the piston, in order to provide an option for delimiting the relative movement of the piston with respect to the sleeve. Thus, for example, when a retaining means is used in the vicinity of the upper opening, the situation may be avoided that, during displacement of the piston in the direction of the upper opening, the user pulls the piston together with the feed plate out of the sleeve, which, for example, could allow plugging compound present in the cavity to escape and soil the surroundings or the user.

It has proven to be advantageous to design the retaining means as a projection which protrudes from the inner wall of the sleeve. The projection may extend circumferentially over the entire inner wall of the sleeve, or also discontinuously or only in one or more sections. In addition, the projection may be designed as a transition to a section of the cavity of the sleeve in which the cavity has a smaller diameter and/or a smaller cross-sectional area than the remainder of the cavity.

Another advantage is a design of the sleeve and/or the feed plate such that one of the feed plates is in contact with the inner wall during a displacement of the piston relative to the sleeve. Plugging compound adhering to the inner wall may advantageously be scraped or sheared off from the inner wall by the feed plate in order to ensure an option for cleaning the inner wall, in order to be able to reuse the device after the plugging compound has been introduced into a borehole. It is conceivable, for example, for the sleeve to be made of a plastic material, wherein the feed plate, which is likewise made of a plastic material, has a cross section that is slightly larger than the cross section of the cavity, so that, although the feed plate slightly and preferably reversibly deforms the sleeve in the particular directly adjoining area, engagement or contact of the feed plate and the inner wall of the sleeve may be ensured, even with material and manufacturing tolerances.

In one advantageous refinement, the sleeve has markings which may indicate the quantity of plugging material that is discharged or is to be discharged. In one variant or in addition, detent points or detent cams are provided which make quantities or depth specifications apparent by visual or tactile means.

A further core concept of the invention is a method for introducing a plugging compound into a borehole, using a device described above, wherein the plugging compound is introduced into the cavity in the sleeve in a first step. When a multicomponent plugging compound is used, the components are preferably mixed prior to being introduced, for example by manual kneading by the user. The introduction may take place, for example, by manually pushing or pressing the plugging compound through the discharge opening into the cavity, in this case the piston together with the feed plate preferably having been moved in the direction of the upper opening prior to the introduction. Another option is to introduce the plugging compound by loading the plugging compound in the manner of a syringe, by displacing the piston together with the feed plate from the side of the discharge opening in the sleeve in the direction of the upper opening.

In a further step, the device containing the plugging compound in the cavity is placed with the support surface on a substrate, for example masonry, containing the borehole, in such a way that the discharge opening is situated above the borehole and the support surface is preferably situated on an area of the substrate adjoining the borehole. A device is preferably used which is adapted to the size of the borehole. Thus, devices are preferably used whose discharge opening is approximately less than or equal to the opening of the borehole in order to allow easy introduction of the plugging compound into the borehole.

In a further step, a relative movement of the piston with respect to the sleeve is brought about in order to displace the feed plate within the cavity in the direction of the discharge opening and to transfer the plugging compound from the cavity into the borehole. For this purpose, the piston may preferably be equipped with an engagement surface, such as a pressure plate, on its side opposite from the feed plate, on which the user may exert pressure, preferably using one hand. Due to the option for supporting or bearing the device with the support surface on the substrate, a sufficient application of force on the piston results in a displacement of the piston together with the feed plate relative to the sleeve, so that the feed plate transfers the plugging compound in the direction of the discharge opening and out of the cavity into the borehole.

In a further step, which is preferably initiated after the plugging compound is introduced into the borehole, the device is removed from the substrate, this removal being initiated by an initial movement of the device substantially in parallel to the plane of the substrate in order to allow shearing of the plugging compound from portions of the device, such as the feed plate.

In a further step, for example the surface of the plugging compound in the borehole may be subsequently smoothed and/or the structure of the surrounding area of the substrate may be adapted. For this purpose the device, for example, may be used, using in particular portions of the support section in order to smooth the plugging compound and/or simulate the mentioned structure. To this end, the device may also have suitable sections or tool areas such as a smoothing area.

In a further step, it is conceivable to introduce a fastening means into the plugging compound. In one embodiment of the method, for this purpose the plugging compound present in the borehole is provided with an opening in order to provide an installation aid for the fastening means. This opening is preferably introduced into the plugging compound when the latter is not yet in the completely cured state. A spike-shaped tool, for example, which in particular may be integrally molded onto the device, may be used for this purpose. In addition, as an auxiliary tool it may be detachably connected to the device or included in the product packaging. The opening is preferably smaller than the fastening means to be introduced into the plugging compound. One variant provides for the fastening means itself to be introduced into the not yet cured plugging compound, for example using a screw for cutting a thread into the plugging compound. The connecting means is preferably removed afterwards in order to completely cure the plugging compound. Thus, in both cases the final introduction of the connecting means preferably does not take place until the plugging compound has completely cured. Another variant provides for complete curing of the plugging compound, an opening being subsequently introduced into the plugging compound by drilling, for example. A connecting means may subsequently be introduced into the opening, or a thread may optionally be cut into the plugging compound in a prior step.

One preferred embodiment is described below with reference to figures, which show the following.

Figure 1:
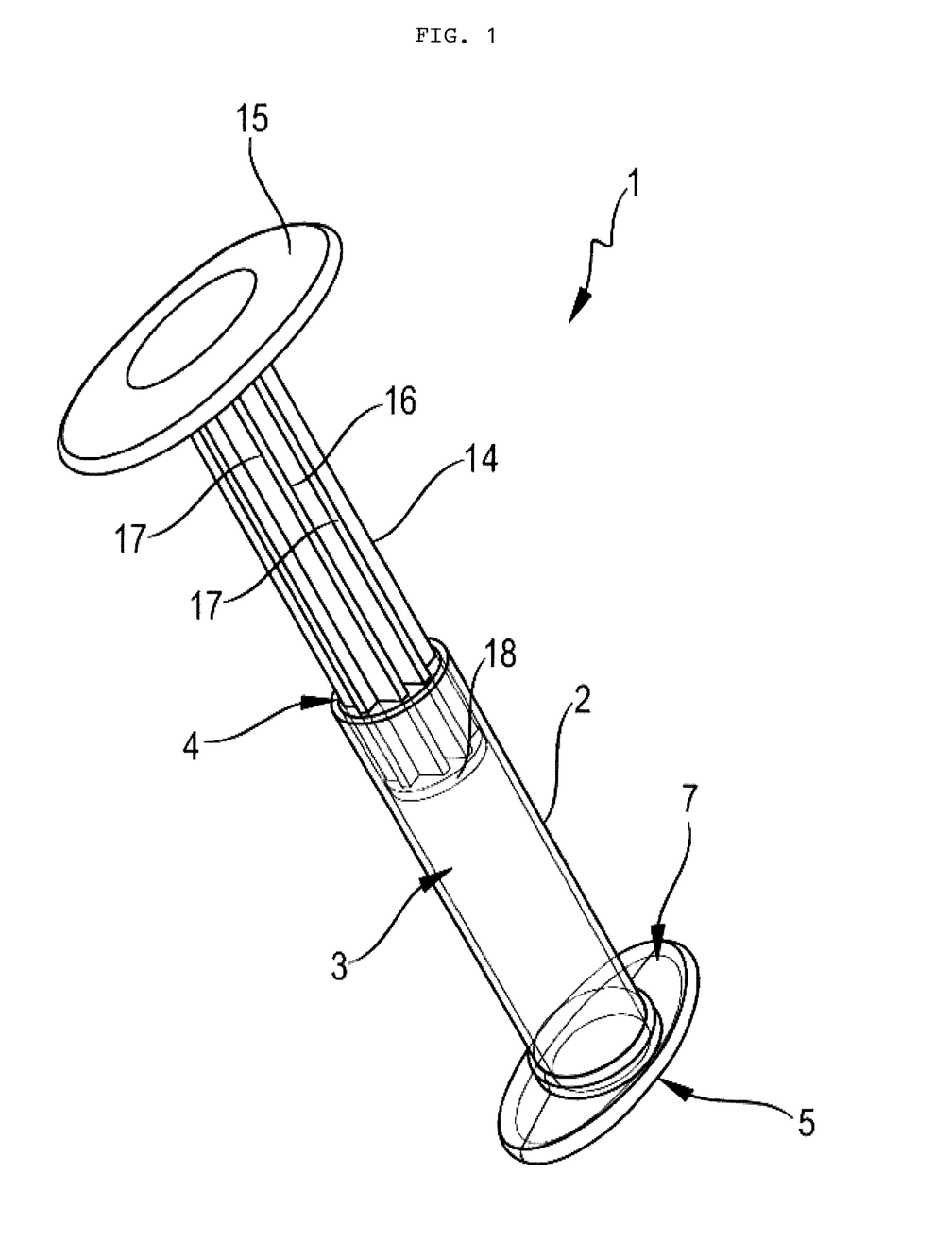
FIG. 1 shows a perspective view of a device according to the invention.

FIG. 1 shows a perspective view of a device 1 according to the invention for introducing a plugging compound, not shown in FIG. 1, into a borehole, the device having a sleeve 3 which surrounds a cavity 3 for receiving the plugging compound. The sleeve 2 has a largely hollow cylindrical shape, and the cavity 3 has a substantially cylindrical basic shape. On the distal front side, the sleeve 2 has a discharge opening 5, corresponding to the cavity 3, for discharging the plugging compound, the cross section of the discharge opening 5 corresponding to the cross section of the cavity 3. In addition, in the area of the discharge opening 5, a support section 7 is integrally molded onto the outer side of the sleeve 2 for providing a support option for the sleeve 3 during introduction of the plugging compound. The sleeve 2 and the support section 7 are made of the same plastic material, and have been manufactured in an injection molding process. In the present exemplary embodiment, a transparent plastic material is used, on the one hand to be able to view the cavity 3, and on the other hand to be able see through the support section 7 during application in order to ensure secure positioning of the device 1.

In addition, an upper opening 4 is provided on the proximal side of the sleeve 2, opposite from the discharge opening 5, through which a punch 14 containing a piston 16 together with a feed plate 18 facing in the distal direction protrudes into the cavity 3. On the proximal side, the punch 14 has a flat, oval-shaped pressure plate 15 which is situated essentially at right angles to the piston 16, via which the user by a pushing or pulling action may move the piston 16 relative to the sleeve 3 in such a way that the feed plate 18 is displaceable in the cavity 3 in the direction of the discharge opening 5 or in the opposite direction, so that the plugging compound may be received or dispensed, for example. The punch 14 is likewise made of a plastic material; the piston is not made of a uniformly solid material, but instead has numerous ribs 17 which extend in parallel to one another in the longitudinal direction of the piston.

Figure 2:
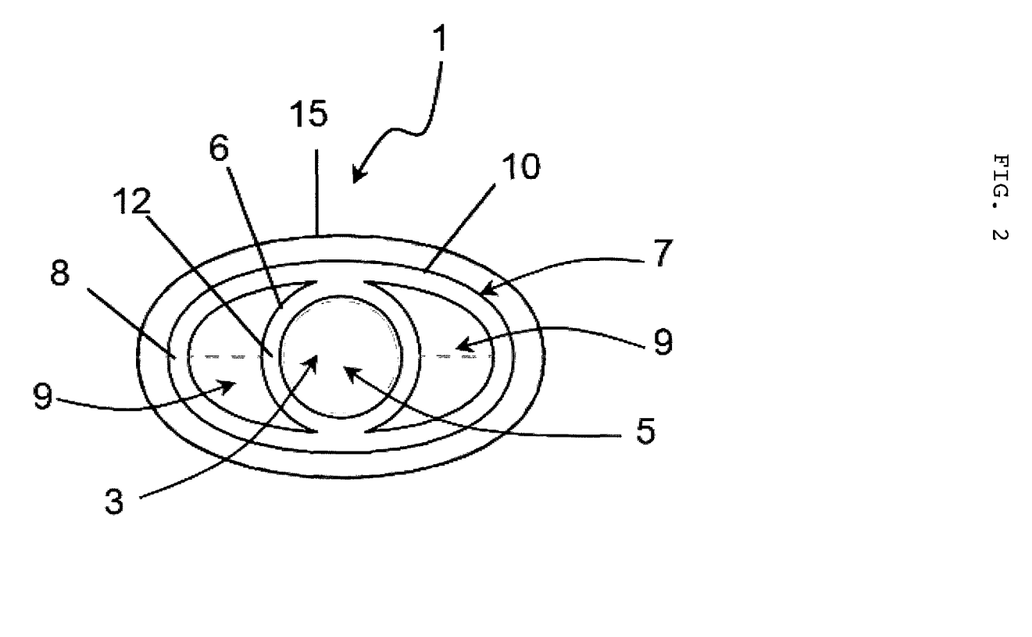
FIG. 2 shows a bottom view of the device from FIG. 1.

FIG. 2 shows a bottom view of the device 1 from FIG. 1. The circular discharge opening 5, which allows access to the cylindrical cavity 5 at the distal side of the device 1, is apparent. The discharge opening 5 is delimited by an opening edge 6 that is formed by the section of the sleeve 2 which protrudes in the distal direction; in the present case an end face 12 is provided.

The projecting support area 7 has an oval shape, and protrudes laterally from the sleeve 2. A support or bearing option for the device 1 is hereby provided by a circumferential support edge 8 around the sleeve which follows the oval basic shape of the support area 7, forms the outer edge of the support area 7, and projects in the distal direction and ends at a support surface 10 at that location. The support surface 10 and the end face 12 lie in a plane. In addition, the support edge 8 and the opening edge 6 are designed in such a way that at the narrow side of the oval of the support area 7, the support edge 8 and the opening edge 6 come into contact in such a way that the support surface 10 and the end face 12 merge into one another. On the wide side of the oval, once again the support edge 10 and the opening edge 6 are spaced apart from one another in such a way that a free space 9 is provided on both sides between the support surface 8 and the end face 12, which may result in the advantages described above. In addition, FIG. 1 shows the oval pressure plate 15, which in the exemplary embodiment shown and in the view shown protrudes laterally beyond the support area 7.

Figure 3:
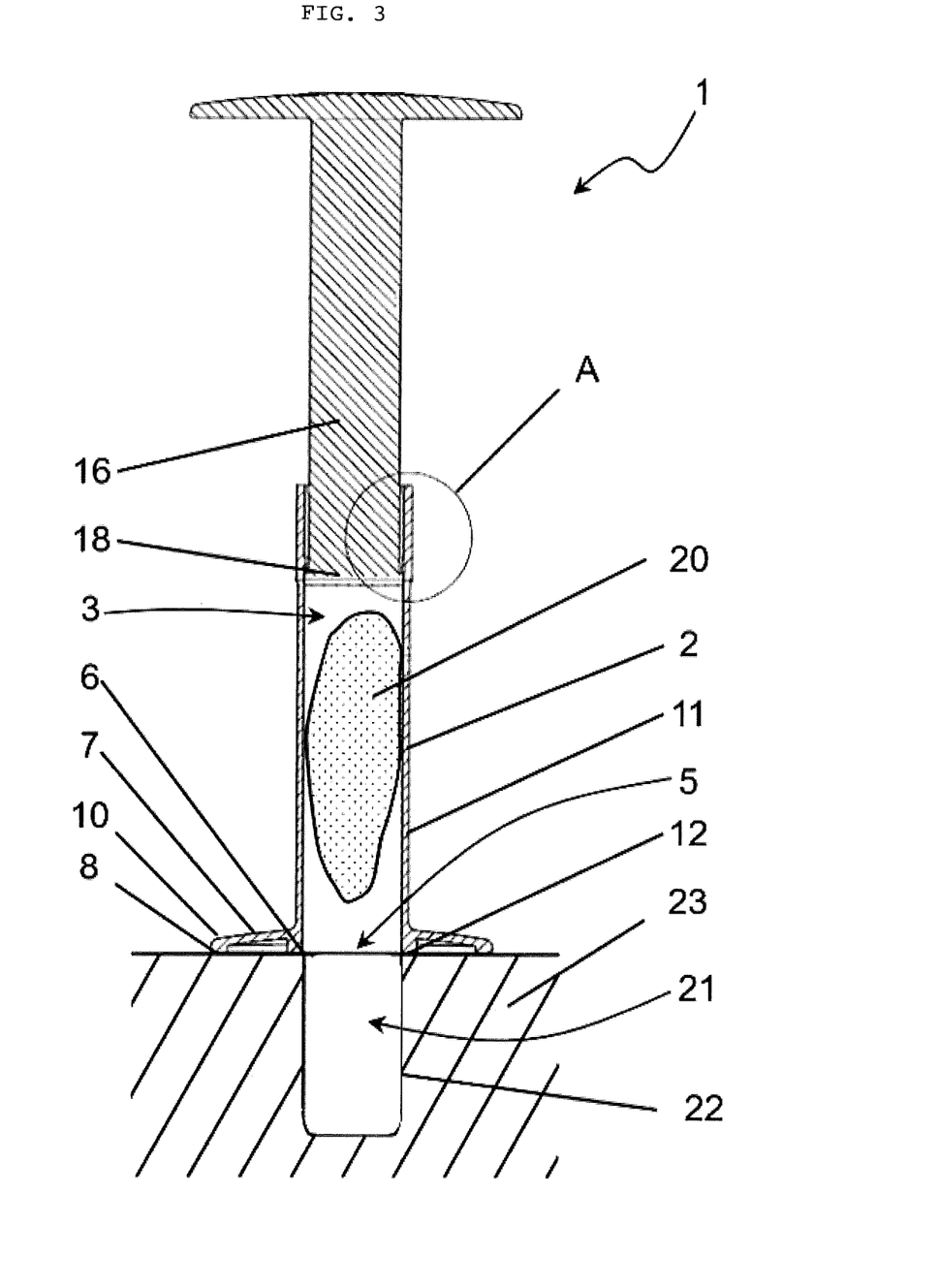
FIG. 3 shows a sectional side view of the device from FIG. 1, with a plugging compound placed on a substrate.

FIG. 3 shows a sectional side view of the device 1 from FIG. 1, with a plugging compound 20 within the cavity 3, the device being placed on a substrate, in the present case a wall 23 made of masonry, into which a borehole 21 has been introduced. The user has mixed together the components of the two-component plugging compound 20, based on epoxy resin, by manually kneading in a method step not depicted. In the position shown, the piston 16, if not already in the shown position, together with the molded-on feed plate 18 has been displaced in the proximal direction in order to provide space for receiving the plugging compound 20. The user has subsequently formed the plugging compound 20 into a suitable shape and introduced it into the cavity 3 in the sleeve 2. In the figure shown, the user has already placed the device 1 above the borehole 21, the support surface 8 of the support edge 10 resting on the outer side of the wall 23 and the discharge opening 5 being situated above the borehole 21. The opening edge 6 with its end face 12 is still situated on the outer side of the wall 23. In the exemplary embodiment shown, the diameter of the borehole 21 approximately corresponds to the diameter of the discharge opening 5, and thus also to the diameter of the cavity 3, so that a borehole wall 22 which delimits the borehole 21 is approximately aligned with the inner wall 11 of the cavity 3. It is particularly easy to introduce the plugging compound 20 with such a configuration. Of course, differences in diameter and shape are also conceivable. However, the borehole 21 is preferably larger than the discharge opening 5 and/or the cross section of the cavity 3.

Figure 4:
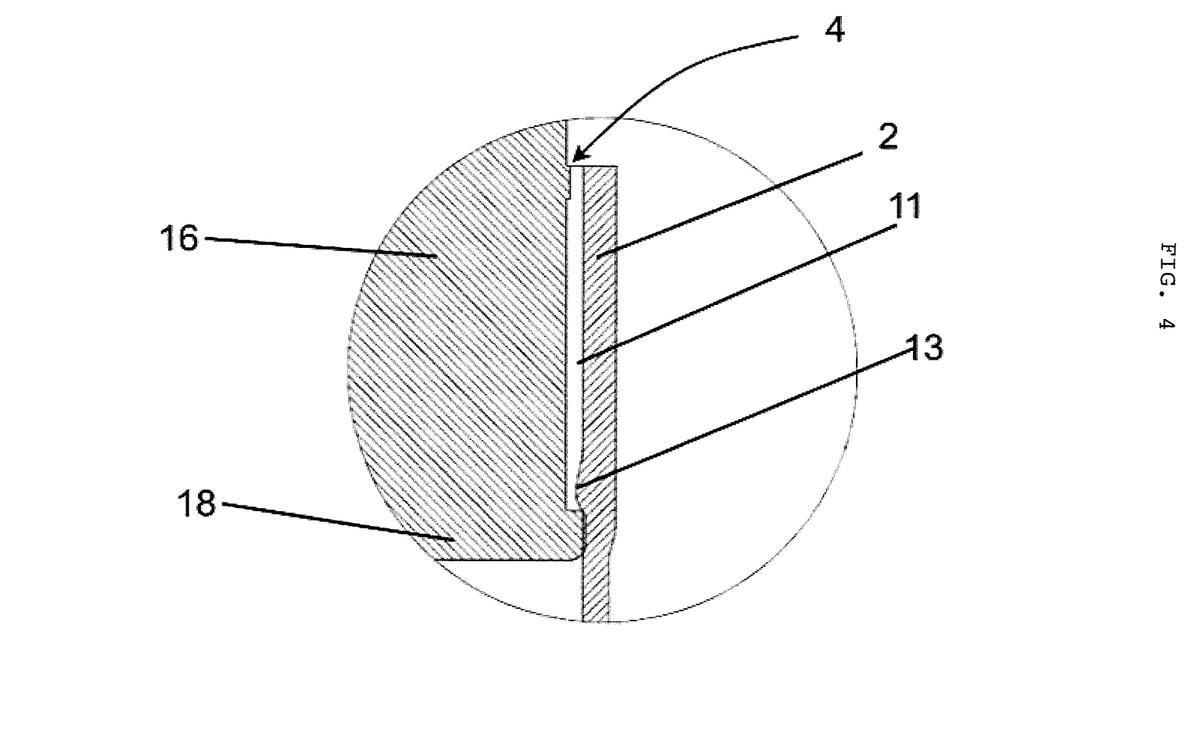
FIG. 4 shows a detailed view of the device from FIG. 3.

FIG. 4 shows a detail A of the device 1 from FIG. 3, the distal section of the piston 16 together with the molded-on feed plate 18 being apparent. The feed plate 18 has a collar that protrudes radially from the outer area of the piston 16, and which is in circumferential contact with the inner wall 11 of the sleeve 2. As described above, the piston 16 is illustrated displaced in the proximal direction, i.e., in the direction of the upper opening 4. To prevent the piston 16 from being pulled out further from the sleeve 2, the sleeve 2 has a protruding projection 13 on its inner wall 11 which is used as a stop for the protruding collar of the feed plate 18. This projection 13 is provided circumferentially over the entire inner wall 11 of the sleeve 2.

Figure 5:
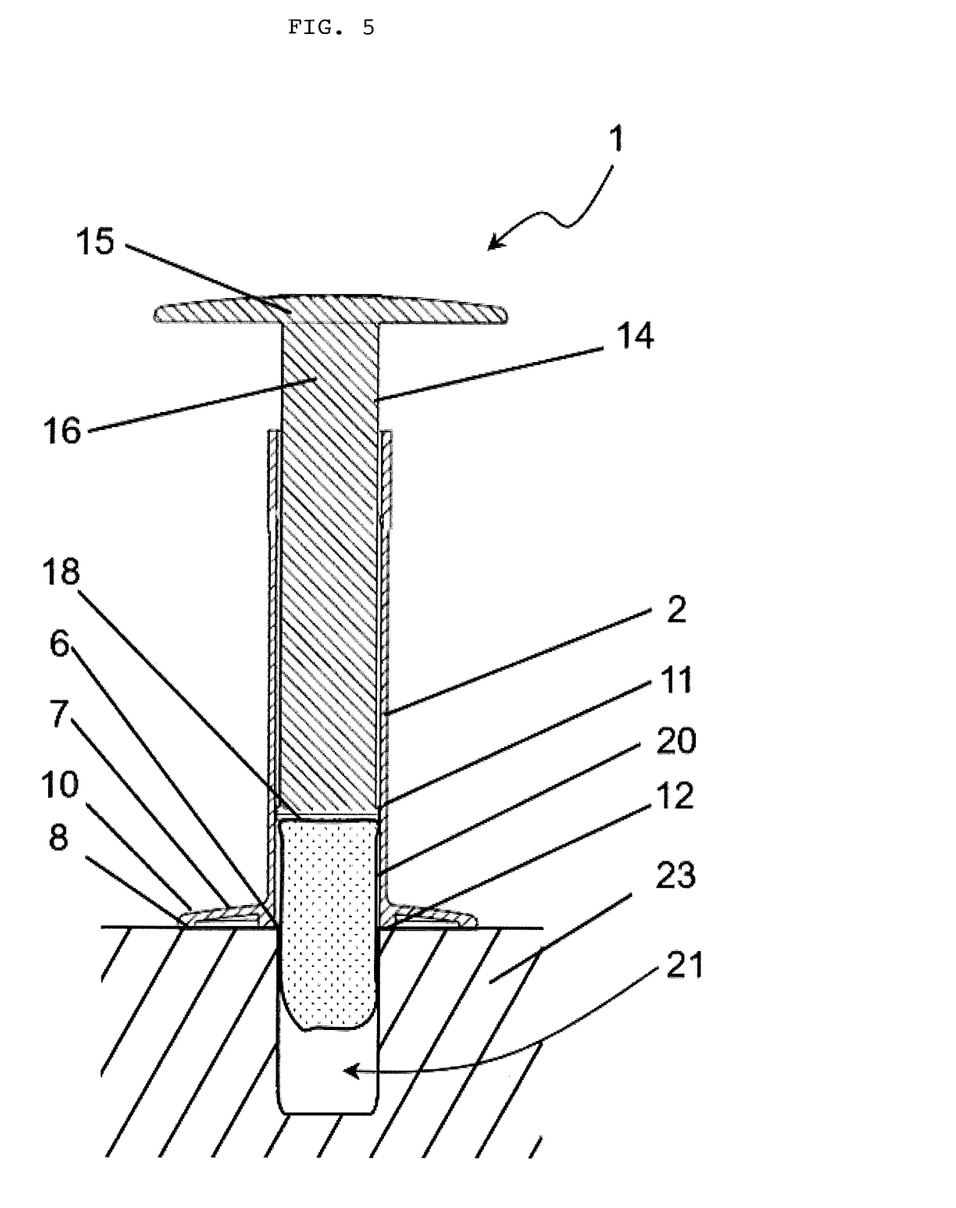
FIG. 5 shows a sectional side view of the device from FIG. 3 during introduction of the plugging compound into a borehole.

FIG. 5 shows a sectional side view of the device 1 from FIG. 3 during the introduction of the plugging compound 20 into a borehole 21. For this purpose, the user exerts pressure on the pressure plate 15 in the direction of the wall 23 or in the direction of the discharge opening 5, so that the piston 16 together with the feed plate 18 is displaced relative to the sleeve 2, the feed plate 18 due to its displacement being moved within the cavity 3 and pressing the plugging compound 20 from the cavity 3 into the borehole 21. Since the feed plate 18 with its protruding collar 18 is in contact with the inner wall 11 of the sleeve 2 during the displacement within the cavity 3, it scrapes or shears off any plugging compound 20 adhering to the inner wall 11 from the inner wall, so that no residues remain within the cavity.

Figure 6:
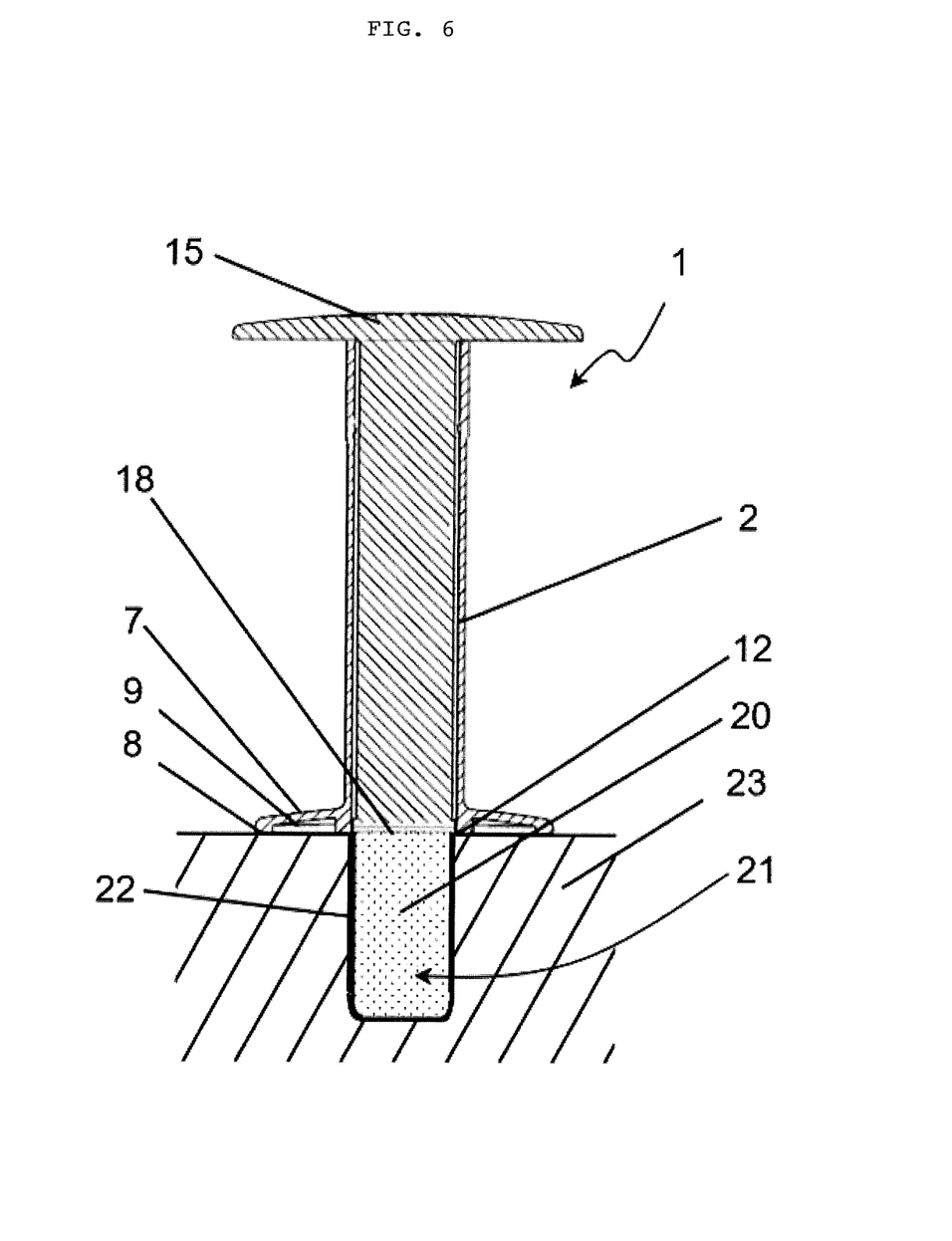
FIG. 6 shows a sectional side view of the device from FIG. 3 after introduction of the plugging compound into a borehole.

FIG. 6 shows a sectional side view of the device from FIG. 3 after the plugging compound 21 has been introduced into a borehole. The entire borehole 21 is preferably filled with plugging compound 20, and the user has also been able to bring the plugging compound 20 into contact with the borehole wall 22 by exerting pressure on the punch plate. In the end position shown, the surface of the feed plate 18 facing in the distal direction preferably lies in a plane with the end face 12 to allow easy removal of the device 1 from the wall 23. The removal is preferably initiated by an initial movement in the lateral direction, i.e., substantially in parallel to the outer side of the wall 23, to allow the plugging compound 20 to be sheared off from the surface of the feed plate 18 facing in the distal direction. If a residue of plugging compound 20 should remain on the feed plate 18 or the end face 12, for example, this residue may be transported into the free space 9 from the support edge 8, for example, during this shearing movement, without soiling the surroundings.

After the removal, the surface of the plugging compound 20 in the borehole 21 is smoothed and/or the structure is adapted to the outer side of the wall 23. The support edge 8 or the pressure plate 15, for example, may be used for this purpose. A connecting means, such as a wood screw, may subsequently be introduced as described above into the plugging compound 20, which is preferably partially cured.

LIST OF REFERENCE NUMERALS

| | |
|---|---|
| 1 | Device |
| 2 | Sleeve |
| 3 | Cavity |
| 4 | Upper opening |
| 5 | Discharge opening |
| 6 | Opening edge |
| 7 | Support section |
| 8 | Support surface |
| 9 | Free space |
| 10 | Support edge |
| 11 | Inner wall |
| 12 | End face |
| 13 | Projection |
| 14 | Punch |
| 15 | Pressure plate |

| | |
|---|---|
| 16 | Piston |
| 17 | Ribs |
| 18 | Feed plate |
| 19 | Collar |
| 20 | Plugging compound |
| 21 | Borehole |
| 22 | Borehole wall |
| 23 | Wall |

The invention claimed is:

1. A device for introducing a plugging compound into a borehole, the device comprising: a sleeve with a cavity for receiving the plugging compound, one end of the sleeve having a discharge opening fluidly connected to the cavity, for discharging the plugging compound, the opposing end of the sleeve including an upper opening through which a piston together with a feed plate protrudes into the cavity, the cavity having an inside diameter that remains the same from the discharge opening to the upper opening, the piston being movable along a piston axis parallel to the sleeve in such a way that the feed plate can be displaced in the cavity in order to allow the plugging compound to be received and dispensed; a support section, permanently attached to the sleeve adjacent the discharge opening and extending laterally from the sleeve.

2. The device according to claim 1, wherein the cavity has a cylindrical shape, at least in the area in which the feed plate can be displaced in the cavity.

3. The device according to claim 1, wherein the discharge opening is aligned with an inner wall which delimits the cavity.

4. The device according to claim 1, wherein the piston is movable on both sides relative to the sleeve to allow the plugging compound to be received into the cavity and discharged for introduction into a borehole.

5. The device according to claim 1, wherein the support section comprises an end face defining the discharge opening, a support surface displaced from the discharge opening, and whereby the support surface and the end face lie in a support surface plane perpendicular to the piston axis.

6. The device according to claim 5, wherein the support section comprises an upper surface between the discharge opening and the upper opening and a free space is defined between the upper surface and the support surface plane and the support surface and the end face.

7. The device according to claim 5, wherein the support surface is provided on a circumferential support edge, and the end face defines the discharge opening, the support surface plane is defined by the support surface and the discharge opening and a cavity is defined in the support section between the support surface and the end face.

8. The device according to claim 1, wherein the sleeve has a retaining means for the piston for limiting the relative movement of the piston with respect to the sleeve.

9. The device according to claim 8, wherein the retaining means is designed as a projection which protrudes from the inner wall of the sleeve.

10. A method for introducing a plugging compound into a borehole, comprising:
providing the device of claim 1;
introducing the plugging compound into the cavity in the sleeve;
placing the device with the support section on a substrate in such a way that the discharge opening is situated above the borehole;
bringing about a relative movement of the piston with respect to the sleeve in order to displace the feed plate within the cavity in the direction of the discharge opening and to transfer the plugging compound from the cavity into the borehole; and
removing the device from the substrate, initiated by an initial movement parallel to the plane of the substrate in order to allow shearing of the plugging compound from the feed plate.

11. The device according to claim 1, wherein the support section comprises an end face for sealingly engaging an exterior surface defining a borehole and a support surface for engaging the exterior surface, the support surface and the end face defining a plane perpendicular to the sleeve.

12. The device according to claim 1, wherein the support section comprises an end face, a support surface and at least a portion of the end face is separated from the support surface by a cavity.

13. The device according to claim 1, wherein the piston comprises a rib extending along its length and the upper opening comprises a notch in which the rib is engaged.

14. The device according to claim 1, wherein the borehole defines a radius and the support section extends for a distance perpendicularly from the sleeve to an edge, wherein the support section distance is greater than the borehole radius.

15. A device for introducing a plugging compound into a borehole, the device comprising: a sleeve with a cavity for receiving the plugging compound, one end of the sleeve having a discharge opening fluidly connected to the cavity, for discharging the plugging compound, the opposing end of the sleeve including an upper opening through which a piston together with a feed plate protrudes into the cavity, the piston being movable along a piston axis parallel to the sleeve in such a way that the feed plate can be displaced in the cavity in order to allow the plugging compound to be received and dispensed; a support section, permanently attached to the sleeve adjacent the discharge opening and extending laterally from the sleeve, wherein the support section has an oval shape and comprises an upper surface, an end face opposing the upper surface and defining the discharge opening, a support surface opposing the upper surface and displaced from the discharge opening, a support surface plane perpendicular to the piston axis defined by the support surface and the discharge opening, and at least two cavities are defined between the end face, the support surface, the upper surface and the support surface plane.

16. A device for introducing a plugging compound into a borehole, the device comprising: a sleeve with a cavity for receiving the plugging compound, one end of the sleeve having a discharge opening fluidly connected to the cavity, for discharging the plugging compound, the opposing end of the sleeve including an upper opening through which a piston together with a feed plate protrudes into the cavity, the piston being movable along a piston axis parallel to the sleeve in such a way that the feed plate can be displaced in the cavity in order to allow the plugging compound to be received and dispensed; a support section, permanently attached to the sleeve adjacent the discharge opening and extending laterally from the sleeve, wherein the support section has an oval shape and comprises an upper surface, an end face opposing the upper surface and defining the discharge opening, a support surface opposing the upper surface and displaced from the discharge opening, a support surface plane perpendicular to the piston axis defined by the support surface and the discharge opening, and at least two semicircular cavities are defined between the end face, the support surface, the upper surface and the support surface plane.

* * * * *